UNITED STATES PATENT OFFICE.

CARL BOSCH, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION OF GERMANY.

MANUFACTURE OF CARBONIC-ACID COMPOUNDS OF AMMONIA.

1,211,393. Specification of Letters Patent. Patented Jan. 9, 1917.

No Drawing. Application filed April 8, 1915. Serial No. 20,047.

*To all whom it may concern:*

Be it known that I, CARL BOSCH, citizen of the German Empire, residing at Ludwigshafen-on-the-Rhine, Germany, have invented new and useful Improvements in the Manufacture of Carbonic-Acid Compounds of Ammonia, of which the following is a specification.

I have found that carbonic acid compounds of ammonia, especially ammonium carbamate, ammonium carbonate or bicarbonate or mixtures of these salts, are easily produced, even when working in a large scale, by introducing ammonia and carbon dioxid into an indifferent liquid that does not mix with water. As such liquids I mention in particular liquid hydrocarbons or mixtures of hydrocarbons, for instance, petroleum or the benzene hydrocarbons or the like. The gases to be introduced into the indifferent liquid that does not mix with water may be in the dry state in which case pure ammonium carbamate will be formed or they may contain water vapor giving rise to the formation of ammonium carbonate, or bicarbonate, or of mixtures thereof with ammonium carbamate, and they can be introduced either simultaneously or separately. The liquid is preferably cooled during the introducing of the said gases. In this way it is possible to obtain the ammonium salts in large quanties in small apparatus, for, by aid of the liquid medium it is easily possible to remove the heat of the reaction, since in the presence of the liquids no crusts form as is the case in their absence, which crusts, when formed on the walls of the apparatus would prevent the cooling. After separating the salts formed, the liquid can easily be used over and over again. The separated salts even if they do contain small quantities of hydrocarbons can nevertheless be used for conversion into urea.

Now what I claim is:—

1. The process of manufacture of carbonic acid compounds of ammonia by introducing ammonia and carbon dioxid into an indifferent liquid that does not mix with water.

2. The process of manufacture of carbonic acid compounds of ammonia by introducing ammonia and carbon dioxid into a vessel containing a cooled indifferent liquid that does not mix with water.

3. The process of manufacture of carbonic acid compounds of ammonia by introducing ammonia and carbon dioxid into a vessel containing a cooled liquid hydrocarbon.

4. The process of manufacture of carbonic acid compounds of ammonia by introducing ammonia and carbon dioxid in the presence of water vapor into an indifferent liquid that does not mix with water.

5. The process of manufacture of carbonic acid compounds of ammonia by introducing ammonia and carbon dioxid in the presence of water vapor into a liquid hydrocarbon.

6. The process of manufacture of carbonic acid compounds of ammonia by introducing ammonia and carbon dioxid in the presence of water vapor into a vessel containing a cooled liquid hydrocarbon.

In testimony whereof I have hereunto set my hand in the presence of two subscribing witnesses.

CARL BOSCH.

Witnesses:
 ARTHUR DENONVILLE,
 C. INNESS BROWN.